Jan. 18, 1927.
A. J. RAVETTI
1,615,036
ROUTE INDICATOR FOR AUTOMOBILES
Filed Feb. 11, 1924   4 Sheets-Sheet 1
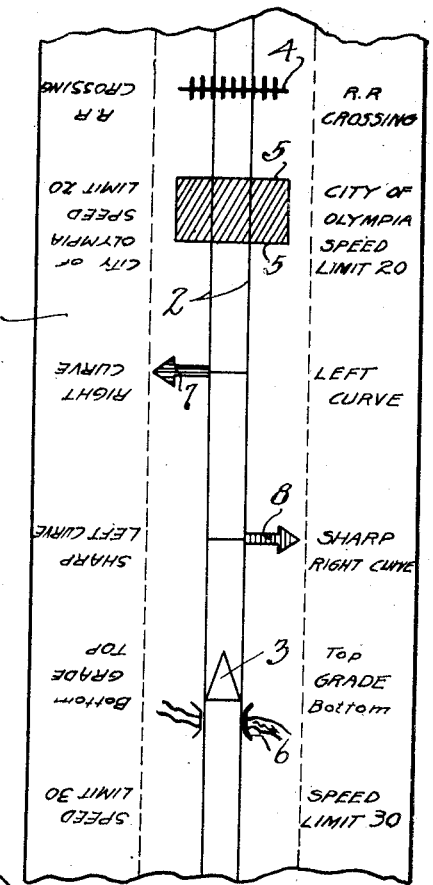
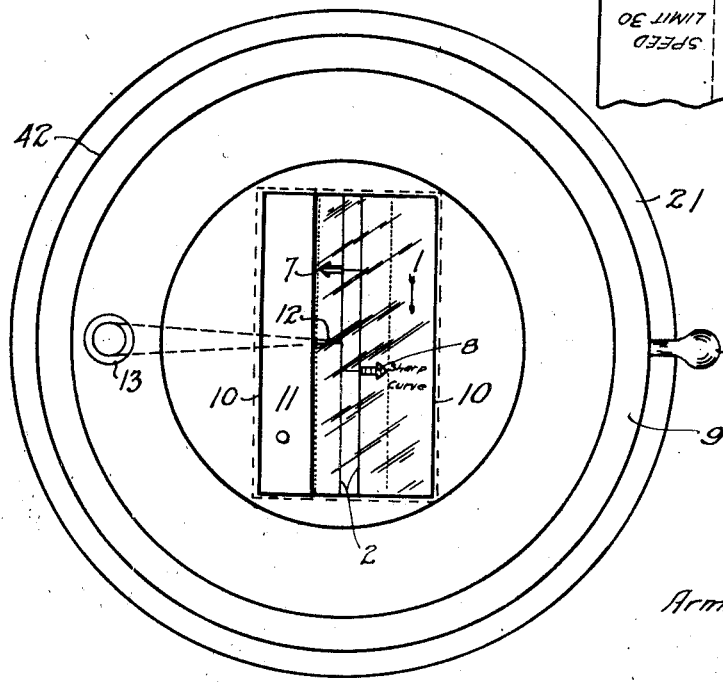
INVENTOR
Armand J. Ravetti
BY
ATTORNEY Jan. 18, 1927. 1,615,036
A. J. RAVETTI
ROUTE INDICATOR FOR AUTOMOBILES
Filed Feb. 11, 1924  4 Sheets-Sheet 2
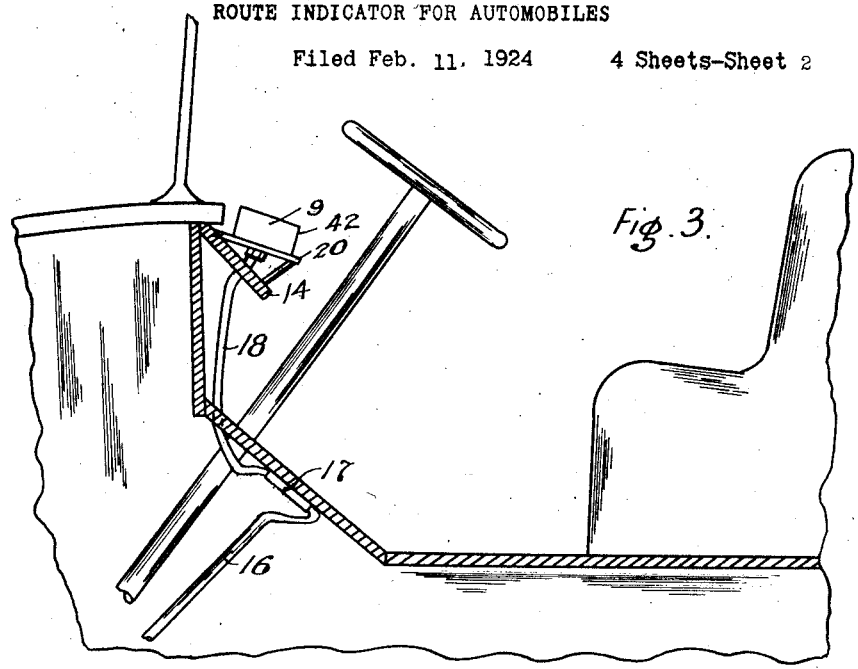
Fig. 3.
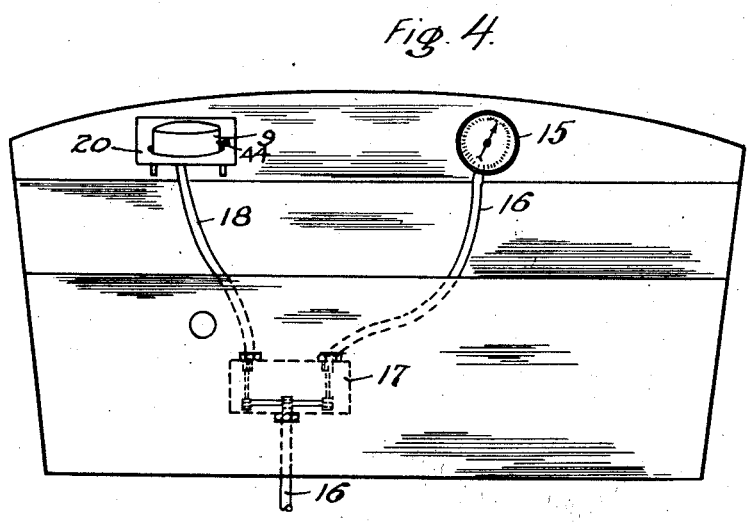
Fig. 4.
INVENTOR
Armand J. Ravetti
BY
ATTORNEY Jan. 18, 1927.  1,615,036
A. J. RAVETTI
ROUTE INDICATOR FOR AUTOMOBILES
Filed Feb. 11, 1924   4 Sheets-Sheet 3
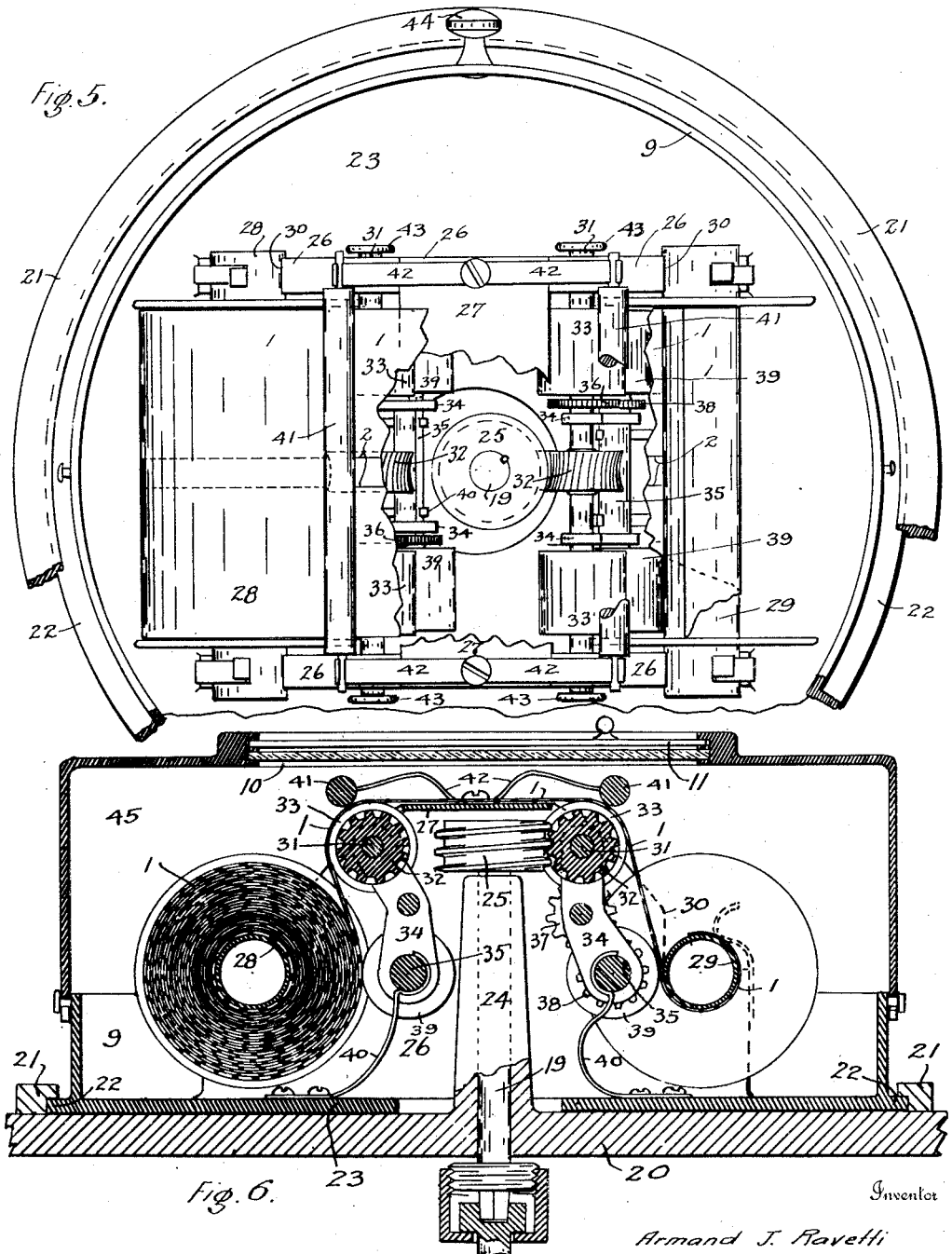

Jan. 18, 1927. 1,615,036
A. J. RAVETTI
ROUTE INDICATOR FOR AUTOMOBILES
Filed Feb. 11, 1924 4 Sheets-Sheet 4

Inventor
Armond J. Ravetti
By
Attorney

Patented Jan. 18, 1927.

1,615,036

UNITED STATES PATENT OFFICE.

ARMAND J. RAVETTI, OF TACOMA, WASHINGTON.

ROUTE INDICATOR FOR AUTOMOBILES.

Application filed February 11, 1924. Serial No. 692,034.

This invention relates to devices mounted in a convenient position within an automobile and adapted to indicate to the driver thereof, at all times, where on a particular route the automobile is located and the characteristics of the route in the immediate approaching distance.

The objects of the invention are to provide a printed route indicator or map for each main route between terminals and to provide means for operating such indicating map. Further objects are to arrange the map so that it will always be moving in a constant direction relative to the driver, at a speed proportionate to the speed of the car, independent of the compass direction of travel and independent of whether the car is traveling from one end of the route or from the other end thereof. Another object is to provide such a map or indicator which shall have a common central part with signs printed thereon, indicating the characteristics of the road, and two side sections, only one being in use at a time, said sections having directions or notes and one being printed with inverted wording but such notes being located opposite the same points of the central part. Other objects are to provide means whereby said route indicator is moved in proportion to the forward travel of the car; to provide means whereby said route indicator driving mechanism may be thrown out of action or may be reversed when desired, by a simple motion of the apparatus; and to provide a simple, neat and effective apparatus, easy to install in the car and easy to insert or remove an indicator strip and easy to adjust said strip to any position on the route, and indicating effectively and simply all the approaching objects and conditions of travel. And a still further object is to provide a means whereby a blank map may be changed into a master indicator (from which subsequent route indicators may be prepared and printed) as the car traverses the route.

I attain these and other objects by the forms, devices, mechanisms and arrangements illustrated in the accompanying drawings, in which—

Figure 7:
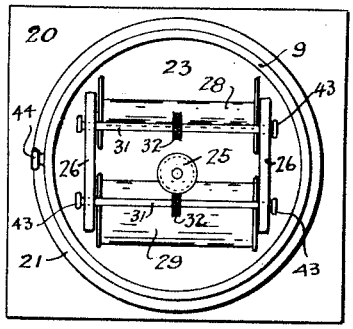
Figure 8:
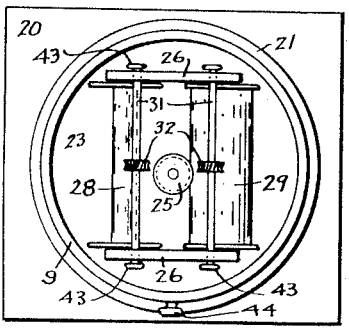
Figure 9:
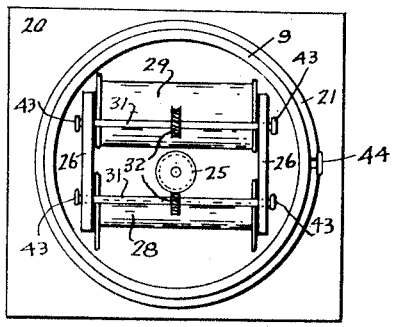
Figure 10:
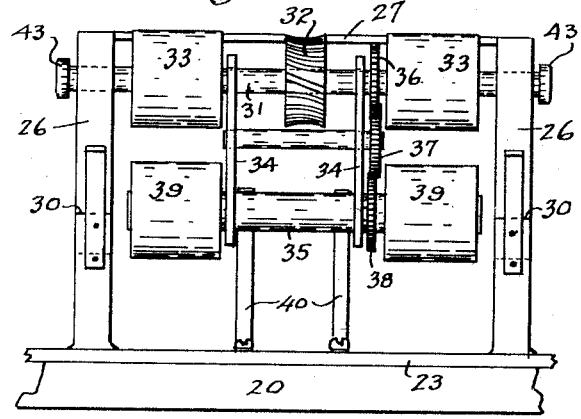
Figure 11:
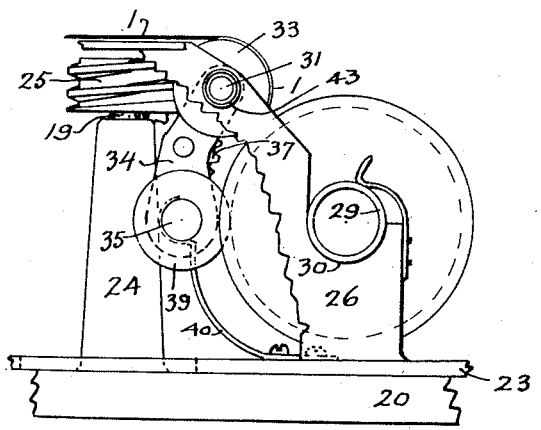

Fig. 1 is a plan view of a portion of the route indicator strip, showing some of the signs or symbols and indicating some of the printed matter thereon; Fig. 2 is a plan of the instrument as seen by the driver and showing a portion of the route indicating strip therein; Fig. 3 is a section of a part of an automobile to illustrate the mounting of the apparatus therein, and Fig. 4 is a front elevation thereof; Fig. 5 is a plan of the instrument, the top having been removed to reveal the interior, and Fig. 6 is a vertical section thereof; Figs. 7, 8 and 9 are diagrammatic views showing respectively instrument box and the indicator strip reels as positioned at the end of a route, as thrown out of action, and as positioned to return or start on a route, respectively; Fig. 10 is a front view of the swinging bracket with its gears and rollers, and Fig. 11 is a side view thereof as mounted in contact with a filled reel. Similar numerals of reference refer to similar parts throughout the several views.

It is a well known fact that a tourist driving an automobile over a strange route is seriously worried and handicapped by his lack of knowledge as to approaching conditions which, if removed, would greatly increase the pleasure, comfort and safety of automobile travel and result in his ability to drive a greater distance with less nervous strain. It is for this general purpose that I have devised the following described route indicator and its apparatus.

Referring first to Fig. 1: The route indicator consists of a strip 1 of paper, or other suitable material, wound originally on one reel and adapted to be unwound therefrom on to another reel and between the reels to be passed within the view of the driver. This strip 1 is divided into three parallel sections, from end to end. The central section has a pair of parallel lines 2 extending longitudinally from end to end of the route, said lines representing the road being traveled. Between or adjacent these lines 2 are signs or symbols showing the characteristics of the route from place to place, for instance, the triangular sign 3 located at grades of greater than a certain slope, the base of said triangle being positioned at or near the foot of the hill and the apex of the triangle being pointed up hill from the base; also other signs, such as railroad crossings, indicated at 4, and city limits, indicated at 5, and bridges, indicated at 6, may be included. It will be observed that the route lines 2 are straight so that in order to indicate approaching curves, the arrows 7 and 8 are printed pointing to one side or the other of the said route lines 2. The arrow pointing to the right indicates an approaching right turn and to the left a left turn. These arrows 7 and 8 are preferably printed in outline form and may be colored in any desired manner to indicate whether the curve is a sharp or an easy one. On one of the side sections of the strip 1 various notes and directions are printed relating to the route and giving such information as will be helpful to the driver, these notes being positioned so as to appear to the driver as they are needed. On the other side section corresponding or complementary notes are printed opposite the same points, but the wording thereof is inverted. Thus it will be seen from Fig. 1, that if the strip 1 is made to travel downward from the top of the sheet towards the bottom thereof, the various signs pass downward and the notes on the right-hand section are to be applied thereto; but if the sheet is inverted, the strip 1 being again made to travel downward (from the sheet base towards its top) the said signs again pass downward and the right-hand side (previously the left-hand side) has the proper notes. In this latter case the designation of the curves as right or left has to be reversed from that designated on the other side.

Referring now to Fig. 2, the strip of paper above described is mounted on two reels within the cylindrical instrument box 9 in such manner that it always travels downward. It is led under a glazed opening 10 in the cover of the box 9. A slide 11 is mounted over the said opening and is arranged so as to expose only the central and right-hand sections of the strip 1. A pointer 12 may be mounted in the box cover and controlled by a knob 13, said pointer being adjustable in position and adapted to indicate the exact position of the automobile on the route as indicated on the chart.

Referring now to Figs. 3 and 4. The cylindrical box 9, in which the strip 1 and its actuating mechanism is contained, is mounted on the instrument board 14 of the car. The speedometer 15 is operated by the usual flexible shaft 16 from the car wheels or other portion of the car and in proportion to the speed of travel and the distance traveled. I operate my route indicator from the same shaft 16 by inserting therein, at any convenient place, a gear box 17 containing suitable transmitting gears by which, on the one hand, the said speedometer 15 is run and, on the other hand, the flexible shaft 18 is driven. This shaft 18 leads from the gear box 17 to the instrument box 9 and terminates therein in a drive shaft 19 (Figs. 5 and 6) which is therefore driven in exact proportion to the speed and distance traveled by the car.

Referring now to Figs. 5 to 11: A base plate 20 is secured to the instrument board 14 of the car and is provided with suitable flanged ring 21, which engages over the outward extending flange 22 of the bottom plate 23 of the box 9. This plate 23 is provided with a large central hole through which the boss or bearing of the above described drive shaft 19 extends, said bearing 24 being secured to the said base plate 20 and being slightly eccentric of the ring 21, and therefore of the bottom plate 23. The drive shaft 19 carries a worm 25 at its upper end.

Two side bearing lugs 26 are formed on the upper side of the bottom plate 23 of the box 9, one on each side of the hereinafter described strip-driving apparatus. These lugs carry the bearings for the reels and for the cross-shafts of said apparatus, and are joined together by a cross-plate 27 extending from one lug to the other at the center and positioned over the top of said worm 25. The strip of paper 1, above described, is fully wound on a reel 28 and an empty reel 29 is provided to receive the strip 1 as the car moves. These reels 28 and 29 are loosely mounted in suitable crotches 30 in the said lugs 26, in such manner that they are held therein but are readily removable therefrom. The centers of these reels 28 and 29 are equidistant from the central axis of the cylindrical box 9 but not equidistant from the axis of the shaft 19, the receiving reel 29 being closer to the said shaft than the supply reel 28. Two cross-shafts 31 are mounted in suitable bearings in the lugs 26 and each is provided with a central worm wheel 32, either one of which is adapted to mesh with the said worm 25 when the box 9, and the plate 23, is turned to one or the other of its two operating positions, but to be out of mesh therewith when in other than said operating positions. Rollers 33, of rubber or other suitable material, are mounted near each end of the shafts 31 and are adapted to engage, support, and drive the strip 1 of paper as the car moves. Two swinging brackets, each comprising two arms 34 and carrying a lower shaft 35, are hung from the above cross-shafts 31. A gear 36 is secured on the shaft 31; an intermediate gear 37, meshes with the gear 36 and is mounted on one of the arms 34 of the swinging bracket; and a third gear 38 meshes with the intermediate gear 37 and is mounted on said lower shaft 35. The gears 36 and 38 are of the same size and therefore the shafts 31 and 35 turn at the same rate and in the same direction on account of the intermediate gear 37. The shaft 35 is provided with two rollers 39, similar in size and material to the rollers 33 above described. Two springs 40 engage the shafts 35 to press them towards the reels 28 and 29 respectively. The rollers 39 are therefore pressed on the outer surface of the reels, or rather on the paper strip 1 wound thereon, and since they are driven at the same rate as the rollers 33 they will cause the strip to be wound on the empty reel 29 as the car moves and at a rate proportionate to the rate of travel of the car, independent of the quantity of paper on the reel, or its diameter. It will be noted that the rollers 33 and 39 which are on the side of the box nearest the reel 29 being wound are driven, while the corresponding rollers 33 and 39 turn idly through their contact with the moving paper strip 1 but are not driven directly by the car. Two idle pressure rollers 41 are mounted on springs 42 from the lugs 26 or the cross-plate 27, and press down on the strip 1 as it passes over the rollers 33.

The parts above described are so positioned and arranged within the box 9 that, when the axis of the paper strip 1 is parallel to the direction of travel of the car, the lower gear 32 is in mesh with the worm 25 and the upper gear 32 is removed therefrom, therefore the paper strip 1 is pulled downward from the upper or feed reel to the lower or receiving reel. And, when the box 9 is turned through 180 degrees the gears 32 turn with it and consequently the gear which was in mesh with the worm 25 is now removed therefrom and idle while the formerly idle gear is now in mesh therewith and is pulling the paper strip downward but is winding it on the reel from which it had been unwound. Also, at an intermediate position, say at 90 degrees, both said gears 32 are out of mesh with the worm 35. In this position the strip may be wound by hand in either direction in order to bring it into proper adjustment. This is illustrated in Figs. 7, 8 and 9, in which Fig. 7 shows the condition of the reels at the end of a trip, the lower reel 29 now being full while the upper reel 28 is empty and the worm 25 is in mesh with the lower gear 32. In Fig. 8 the box has been turned through 90 degrees and consequently both gears 32 are out of mesh with the worm 25. In Fig. 9 the box has been further turned through another 90 degrees and now the lower gear 32 is again in mesh with the worm 25 thus driving the empty reel 28 and drawing the paper strip 1 from the full reel 29 in a downward direction. In this position the motion of the strip 1 has therefore been reversed relative to the reels and will be rewound on the reel from which it had been unwound, and the notes and directions thereon will be readable only if inverted from the similar notes which were readable when the box was in its first position.

The box 9 is arranged with a removable cover 45 which permits the interior thereof to be reached for changing route reels and for adjusting them to the approximate correct position. The strip 1 is threaded through the mechanism by first inserting the full reel 28 in the upper crotch 30 so that when the end of the strip 1 is pulled to unwind the reel the part nearest the center of the box moves upward. The said end of the strip is thus passed under the rollers 39 and drawn upward and threaded between the rollers 33 and 41. It is then drawn across and above the cross-plate 27 and fed between the other pair of rollers 33 and 41; thence downward between the rollers 39 and the empty reel 29, to which it is attached in any suitable manner. In case the position of the car, when the new route indicator is inserted, is other than the beginning of the said route then I turn the shafts 31 (the box having been paced in the intermediate or disengaged position) by suitable knobs 43 provided therefor, until the desired portion thereof is exposed to view, after which the exact location can be adjusted by the pointer 12 above described.

In order to turn the cylindrical box 9 into any of the above three positions I provide a suitable knob or handle 44 thereon, and any suitable stop may be provided to hold the box in said position.

My apparatus may also be used in making the first or master route indicator, by running a blank strip therethrough and marking the appropriate signs and notes in pencil as the car reaches the respective points in the route. This blank strip is provided with the route lines 2 printed thereon. In this connection the cover would be changed so as to permit the marking of the strip through the opening as the strip passes the pointer 12.

Thus a route map may be prepared which will be accurate for all cars having similar devices and which will show the driver what is to be expected as he proceeds over the route.

Having therefore described my invention, what I claim is:—

1. A route indicator comprising in combination a closed receptacle mounted on the car and having a glazed opening in its cover; a pair of reels mounted in the receptacle adjacent each end of said glazed opening; means driven by the car and driving one of said reels; a strip wound on the other or supply reel and passing therefrom close to and under said glazed opening to said driven reel; signs on said strip whereby the approaching characteristics of the route are indicated through the glazed opening to the driver as he proceeds; and a slide on the cover and closing a part of said glazed opening, said slide being adapted to restrict the opening to one side or the other whereby the parts of the strip adapted for use are exposed to view and the other part thereof is hidden by the slide.

2. A route indicator comprising in combination a revolubly adjustable receptacle mounted on the car; a drive shaft projecting thereinto on an axis parallel to but eccentric from the axis of said receptacle; means driven by the car and actuating the drive shaft whereby said shaft is driven in proportion to the forward travel of the car; a worm on said drive shaft; a pair of worm wheels mounted in said receptacle symmetrically relatively to its axis, either of which is adapted to come into mesh with the worm when the receptacle is revolved into one of another operating position and to be out of mesh therewith when at other positions; a pair of reels mounted in said receptacle adjacent said worm wheels and adapted to be turned thereby; a strip wound on both said reels and extending therebetween, whichever said reel being actuated by said drive shaft winding the strip thereon from the other reel; and signs on said strip whereby approaching characteristics of the route are indicated, on the portion thereof lying between the said reels, to the view of the car driver.

3. A route indicator as set forth in claim 2, wherein the worm wheels are mounted on cross-shafts; and together with friction rollers mounted on said cross-shafts and engaging said strip whereby the strip is caused to move in proportion to the travel of the car.

4. A route indicator as set forth in claim 2, together with sets of gears operated by said worm wheels; and friction rollers operated by said gears and engaging said strip and said reels, whereby the strip is caused to move and the reel to be wound in proportion to the travel of the car.

5. A route indicator as set forth in claim 2, together with swinging brackets mounted concentric with said worm wheels; sets of gears mounted on said swinging brackets and operated by said worm wheels; friction rollers operated by said gears; and springs acting on said swinging brackets to keep said friction rollers pressed against the strip wound on the reels whereby the strip is caused to move and the reel to be wound in proportion to the travel of the car.

6. A route indicator as set forth in claim 2, together with two sets of friction rollers operated by each said worm wheel, a first set being coaxial with the worm wheel and a second set being revoluble about the center of said worm wheel; and springs pressing the second sets against the strip wound on the reels whereby, when the strip is threaded from one reel to the other, it passes over said first sets of rollers and is caused to move longitudinally in proportion to the travel of the car and the reel on which it is being wound is rotated at a similar circumferential speed.

7. A route indicator for propelled vehicles comprising a casing having a plane window, a driving gear driven by the travel of the vehicle, two driven gears on opposite sides of said driving gear and adapted to selectively mesh with said driving gear, two map spools mounted in said casing and driven by said gears, a map wound on said spools and traveling behind the window, said casing adapted to be rotated about an axis perpendicular to the plane of said window, and means for bringing either of said driven gears into selective engagement with said driving gear upon rotation of said casing for reversing the travel of said map.

ARMAND J. RAVETTI.